United States Patent
Buckley et al.

(10) Patent No.: US 7,110,140 B1
(45) Date of Patent: Sep. 19, 2006

(54) METHODS AND SYSTEMS FOR UNDERCOLOR REDUCTION

(75) Inventors: Robert R. Buckley, Rochester, NY (US); Randall P. Cole, Victor, NY (US)

(73) Assignee: XEROX Corporation, Stamford, CT (US)

(*) Notice: Subject to any disclaimer, the term of this patent is extended or adjusted under 35 U.S.C. 154(b) by 0 days.

(21) Appl. No.: 09/368,354

(22) Filed: Aug. 5, 1999

(51) Int. Cl.
H04N 1/54 (2006.01)
G06F 15/00 (2006.01)

(52) U.S. Cl. .................. 358/1.9; 358/515; 358/529

(58) Field of Classification Search .......... 358/1–9, 358/515, 518, 527, 529, 531, 537, 521, 538, 358/453, 450, 464, 1.9, 2.1, 3.01, 3.02, 3.1; 382/163
See application file for complete search history.

(56) References Cited

U.S. PATENT DOCUMENTS

| | | | |
|---|---|---|---|
| 4,700,399 A | 10/1987 | Yoshida | |
| 4,953,015 A | 8/1990 | Hayasaki et al. | |
| 5,168,552 A | 12/1992 | Vaughn et al. | |
| 5,241,396 A | 8/1993 | Harrington | |
| 5,295,236 A | 3/1994 | Bjorge et al. | |
| 5,313,570 A | 5/1994 | Dermer et al. | |
| 5,386,305 A | 1/1995 | Usami | |
| 5,392,365 A | 2/1995 | Steinkirchner | |
| 5,402,245 A * | 3/1995 | Motta et al. ............. | 358/1.9 |
| 5,438,653 A | 8/1995 | Boenke et al. | |
| 5,515,479 A | 5/1996 | Klassen | |
| 5,519,815 A | 5/1996 | Klassen | |
| 5,542,052 A * | 7/1996 | Deutsch et al. .......... | 345/589 |
| 5,563,985 A | 10/1996 | Klassen et al. | |
| 5,613,046 A * | 3/1997 | Dermer ................... | 358/1.9 |
| 5,633,662 A * | 5/1997 | Allen et al. .............. | 347/15 |
| 5,635,967 A | 6/1997 | Klassen | |
| 5,649,071 A | 7/1997 | Klassen et al. | |
| 5,666,543 A | 9/1997 | Gartland | |
| 5,668,931 A | 9/1997 | Dermer | |
| 5,687,303 A | 11/1997 | Motamed et al. | |
| 5,706,414 A * | 1/1998 | Pritchard ................. | 358/1.18 |
| 5,731,823 A * | 3/1998 | Miller et al. ............. | 347/5 |
| 5,752,057 A | 5/1998 | Lifshitz et al. | |
| 5,754,746 A * | 5/1998 | Blurfrushan et al. ..... | 358/1.15 |
| 5,767,886 A * | 6/1998 | Kawakami et al. ...... | 347/115 |
| 5,784,172 A | 7/1998 | Coleman | |
| 5,786,831 A * | 7/1998 | Fukushima et al. ...... | 347/43 |
| 5,894,358 A * | 4/1999 | Ebner et al. ............. | 358/529 |
| 5,920,645 A * | 7/1999 | Aida ....................... | 382/167 |
| 5,926,185 A * | 7/1999 | Vyncke et al. .......... | 345/619 |
| 5,960,161 A * | 9/1999 | Bloomberg et al. ..... | 358/1.9 |

(Continued)

OTHER PUBLICATIONS

Klassen, R. Victor, "Reducing Ink Coverage Levels in Binary CMYK Images", Society for Imaging Science and Technology 46th Annual Conference Proc., 1993, pp. 302-304.*

*Primary Examiner*—Joseph R. Pokrzywa
(74) *Attorney, Agent, or Firm*—Oliff & Berridge, PLC

(57) ABSTRACT

Undercolor reduction is performed to a color image that is to be marked to reduce an amount of marking material used to mark underlying colors in overmarked pixels where a top color is marked over at least one underlying color. Information is generated to designate the overmarked pixels. This information may be generated as tags. A raster image is created in which both the underlying and top colors are included in the overmarked pixels. The image data of the raster image is modified such that an amount of marking material used to mark the at least one underlying color in each overmarked pixel is reduced.

22 Claims, 4 Drawing Sheets

U.S. PATENT DOCUMENTS 5,982,937 A * 11/1999 Accad ................... 382/239
6,031,630 A *  2/2000 Blair et al. ............. 358/1.9
6,042,211 A *  3/2000 Hudson et al. ........... 347/15
6,049,339 A *  4/2000 Schiller et al. .......... 345/630
6,118,548 A *  9/2000 Ryan ..................... 358/1.9
6,295,133 B1 * 9/2001 Bloomquist et al. ....... 358/1.1
6,324,305 B1 * 11/2001 Holladay et al. ......... 382/239
6,343,846 B1 * 2/2002 Asano ................... 347/14

* cited by examiner

METHODS AND SYSTEMS FOR UNDERCOLOR REDUCTION

BACKGROUND OF THE INVENTION

1. Field of Invention

This invention relates to methods and systems for undercolor reduction.

2. Description of Related Art

When marking an image in which black text or other dark features are superimposed on a colored background, it is often desirable to first mark the colored background and then mark the text or other dark features on top of the background marking material. This eliminates or masks any mis-registration of the text or other dark features with respect to the background.

However, simply overmarking the text or other dark features on top of the background marking material can result in an excessive build-up of marking material on a marking substrate, which in turn causes marking material transfer problems and/or problems with the marking substrate, such as paper cockling and/or curling when the marking substrate is paper.

To alleviate these problems, undercolor reduction methods have been introduced, in which a reduced amount of background marking material is applied to areas that are to be overmarked. Examples of such methods are set forth in U.S. Pat. Nos. 5,687,303, 5,649,071, 5,635,967, 5,563,985, 5,519,815 and 5,515,479, each incorporated herein by reference in its entirety.

In these methods, a temporary record is kept of each color separation bitmap of an image to be marked so that, prior to actual marking, locations where a black marking material is to be marked over one or more of cyan, magenta and yellow marking materials are known. Data for colors underlying the black marking material can then be modified so that a reduced amount of these underlying colors are marked on the marking substrate.

SUMMARY OF THE INVENTION

The above-described methods typically require custom software to implement undercolor reduction in conjunction with a raster image processor (RIP), because a typical RIP output is a raster image that only contains on-top or visible colors. Underlying colors are typically discarded during the raster image processing. Therefore, additional software is needed to retain the information of the underlying colors. It would be advantageous to implement undercolor reduction using an existing raster image processor adding little, if any, custom software. Instead of using custom software, it would be advantageous to use off-the-shelf software and inexpensive post-RIP hardware or software.

This invention provides systems and methods for implementing undercolor reduction using an existing raster image processor. In one exemplary embodiment, the systems and methods according to this invention process image data of a color image containing overmarked pixels where at least one first color is to be overmarked by a second color. This processing includes generating information that designates the overmarked pixels, performing raster image processing to create a raster image of the color image, and modifying image data of the overmarked pixels in the raster image. The raster image processing includes overmarking processing that allows both the at least one first color and the second color to be included in the marked pixels in the raster image.

Modifying the image data includes, for example, modifying a value of image data corresponding to the at least one first color. This results in a reduced amount of marking material corresponding to the at least one first color being applied to a marking substrate.

The information that designates the overmarked pixels may be generated in the form of tags. Alternatively, pattern recognition may be performed to recognize specified patterns, and pixels that form these specified patterns may be designated as the overmarked pixels.

These and other features and advantages of this invention are described in or are apparent from the following detailed description of various exemplary embodiments of the systems and methods according to this invention.

BRIEF DESCRIPTION OF THE DRAWINGS

Various embodiments of this invention will be described in detail, with reference to the following figures, wherein.

DETAILED DESCRIPTION OF EXEMPLARY EMBODIMENTS

In the systems and methods of this invention, raster image processing is performed that allows both underlying color information and overmarked color information to be stored in a same pixel in a raster image. The underlying color information in the raster image is modified to a reduced value, i.e., a value at which a reduced amount of marking material is applied when marking is performed.

Figure 1:
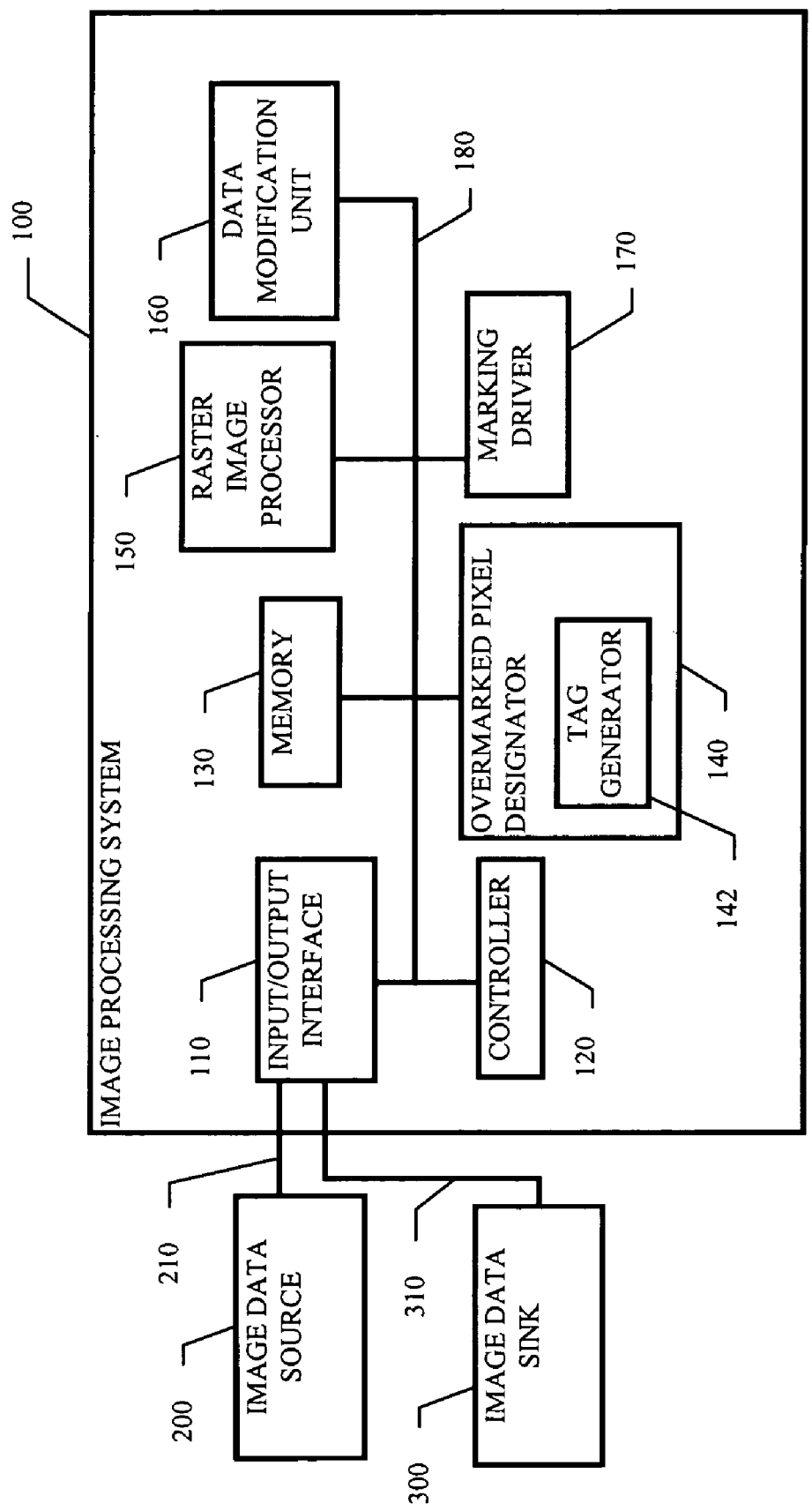
FIG. 1 is a functional block diagram of one exemplary embodiment of an image processing system according to this invention.

FIG. 1 is a functional block diagram of a first exemplary embodiment of an image processing system 100 according to this invention. The image processing system 100 includes an input/output interface 110, a controller 120, a memory 130, an overmarked pixel designator 140, a raster image processor (RIP) 150, a data modification unit 160 and a marking driver 170, all of which are interconnected by a data/control bus 180. The overmarked pixel designator 140 includes a tag generator 142 that generates tags and associates the tags with individual pixels as described below. The image processing system 100 shown in FIG. 1 is connected to a data source 200 and a data sink 300 via the interface 110.

The data source 200 and the data sink 300 are depicted in the exemplary embodiment shown in FIG. 1 as external to the image processing system 100, and connected to the data/control bus 180 via the input/output interface 110. However, either or both of the data source 200 and the data sink 300 may alternatively be provided as an integral part of the image processing system 100, and/or connected directly to the data/control bus 180. For example, the image processing system 100 may be a digital printer, digital copier or the like. In this case, the data source 200 would correspond to a page description language (PDL) or printer control language (PCL) emitter and the data sink 300 would correspond to a digital printer or the printing unit of a digital copier.

In the exemplary embodiment shown in FIG. 1, the image processing system 100 is connected to the image data source 200 over a signal line or link 210 that provides color image data, and is connected to the image data sink 300 over a signal line or link 310 that receives image data output by the image processing system 100. In general, the image data source 200 can be any one of a number of different sources, such as a scanner, a digital copier, a facsimile device that is suitable for generating electronic image data, a host computer, or a device suitable for storing and/or transmitting electronic image data, such as a client or server of a distributed network, such as the Internet, and especially the World Wide Web. The image data source 200 may be also be a data carrier such as a magnetic storage disk, CD-ROM or the like, or a host computer, that contains color image data.

Thus, the image data source 200 can be any known or later developed source that is capable of providing electronic image data to the image processing system 100 according to this invention. Similarly, the image data sink 300 can be any known or later developed device that is capable of receiving processed image data output by the image processing system 100 and either storing, transmitting, or printing the image data. Thus, the image data sink 300 can be a printer, a facsimile machine, a digital copier, a host computer, a remotely located computer, or a storage device for indefinitely storing the processed image data until there arises a need to print or further transmit the processed image data. The storage device can be any known structural apparatus for indefinitely storing the processed image data, such as a RAM, a hard drive and disk, a floppy drive and disk, an optical drive and disk, a flash memory or the like.

Each of the links 210 and 310 can be any known or later developed device or system for connecting the image data source and sink 200 and 300 to the image processing system 100, including a direct cable connection, a public switched telephone network, a wireless transmission channel, a connection over a wide area network or a local area network, a connection over an intranet, a connection over the Internet, or a connection over any other distributed processing network or system. In general, each of the links 210 and 310 can be any known or later developed connection system or structure usable to connect the image data source and sink 200 and 300 to the image processing system 100. Further, it should be appreciated that the source 200 and/or sink 300 may be connected to the image processing system 100 directly, as dedicated devices.

While FIG. 1 shows the image processing system 100 as a device separate from the image data source 200 and the image data sink 300, the image processing system 100 may be an integrated device, such as a digital copier, computer with a built-in printer, or any other integrated device that is capable of producing a hard copy image output. With such a configuration, for example, the image data source 200, the image processing system 100, and the image data sink 300 may be contained within a single device. For example, in the case of a digital copier, the image processing system 100, an image data source 200 such as a scanning device, and an image data sink 300 such as print-out device may all be provided in the same machine. As another example, in the case of a printer, the image processing system 100 and the image data sink 300, for example a printing unit, may be part of the same machine, and the image data source 200, for example a scanner or a computer memory, may be physically separate.

The memory 130 is preferably implemented using static or dynamic RAM. However, the memory 130 can also be implemented using a floppy disk and disk drive, a writeable optical disk and disk drive, a hard drive, flash memory or the like. Provided the memory size and/or configuration allows, any or all of the incoming data may be stored in the memory 130 at any point before, during or after further processing within the image processing system 100.

The controller 120, the overmarked pixel designator 140, the raster image processor 150, the data modification unit 160 and/or the marking driver 170 can be implemented as physically distinct hardware circuits within one or more ASICs, or using one or more FPGAs, PDLs, PLAs, or PALs, or using discrete logic elements or discrete circuit elements. The controller 120, the overmarked pixel designator 140, the raster image processor 150, the data modification unit 160 and/or the marking driver 170 may also be implemented wholly or partially in software. The particular form each of the systems shown in FIG. 1 will take is a design choice and will be obvious and predictable to those skilled in the art.

In the exemplary embodiment shown in FIG. 1, processing within the image processing system 100 is performed under control of the controller 120. Color image pixel data is input from the data source 200 via the input/output interface 110. The input color image pixel data may be temporarily stored in the memory 130.

The overmarked pixel designator 140 generates information that designates overmarked pixels among the color image pixel data. Overmarked pixels are pixels in which a top color, such as black, is to be marked over any combination of underlying colors, such as cyan, magenta and yellow. Specifically, in the exemplary embodiment shown in FIG. 1, the tag generator 142 in the overmarked pixel designator 140 generates a tag for each overmarked pixel. The tags are associated with the respective overmarked pixels, and designate the overmarked pixels as "black image", "black text", "black stroke" or the like. It should be appreciated that the tags may have been created previously, before the color image data is input from the image data source 200, or may be created during the raster image processing.

The actual tag used to designate the overmarked pixels may vary. Preferably, a "black text" tag is used for designating black text pixels, because a "black text" tag clearly indicates that overmarking is to be performed in the associated pixel. If merely a "text" tag were used, for example, it could not be discerned, based solely on the tag, whether a pixel with CMYK values=c,m,y,1 is the result of overmarking a CMYK=c,m,y,0 with black, or marking CMYK=c,m,y,1 directly. However, if CMYK=c,m,y,1 is a seldom-specified text color, then an assumption may be made that CMYK=c,m,y,1 signifies an overmarked pixel, and a "text" tag can effectively designate an overmarked pixel.

The raster image processor 150 creates a raster image from the input color image pixel data. Unlike a conventional raster image, the raster image created by the raster image processor 150 allows both underlying colors and top colors to be included. This is accomplished by an overmarking function that is provided in the raster image processor 150. The overmarking function may be implemented, for example, in a PostScript implementation by using the setoverprint operator with value true whenever overmarking is desired. setoverprint could be set true just before black text is printed, or the show operator used to print black text could be overloaded with an operator that included the setoverprint operator.

The overmarked pixel designator 140 and the raster image processor 150 may operate concurrently, and/or the overmarked pixel designator 140 may be provided within the raster image processor 150.

The data modification unit 160 modifies data in the raster image that has been created by the raster image processor 150. More specifically, the data modification unit 160 modifies values of data that corresponds to the underlying colors in overmarked pixels. For example, where a value of data that corresponds to an underlying color in an overmarked pixel indicates an amount of corresponding marking material to be put down on a marking substrate, the data modification unit 160 reduces this value so that a reduced amount of the corresponding marking material will be put down.

The amount by which the marking material is reduced may be determined according to previously determined methods. For example, each underlying color present may be reduced by a specified percentage, and/or reduction may be performed such that the total amount of marking material to be applied for a given pixel is less than or equal to a specified amount.

After the data of the overmarked pixels has been modified as described above, the raster image is sent to the marking driver 170, which generates marking control signals and/or other marking control information to be output to the image data sink 300 to enable marking to be performed based on the modified raster image. As described in detail above, the image data sink 300 may be a printer or the like that performs printing based on the modified raster image, or an intermediate device that stores or further transmits the control signals and/or other control information from the marking driver 170.

Figure 2:
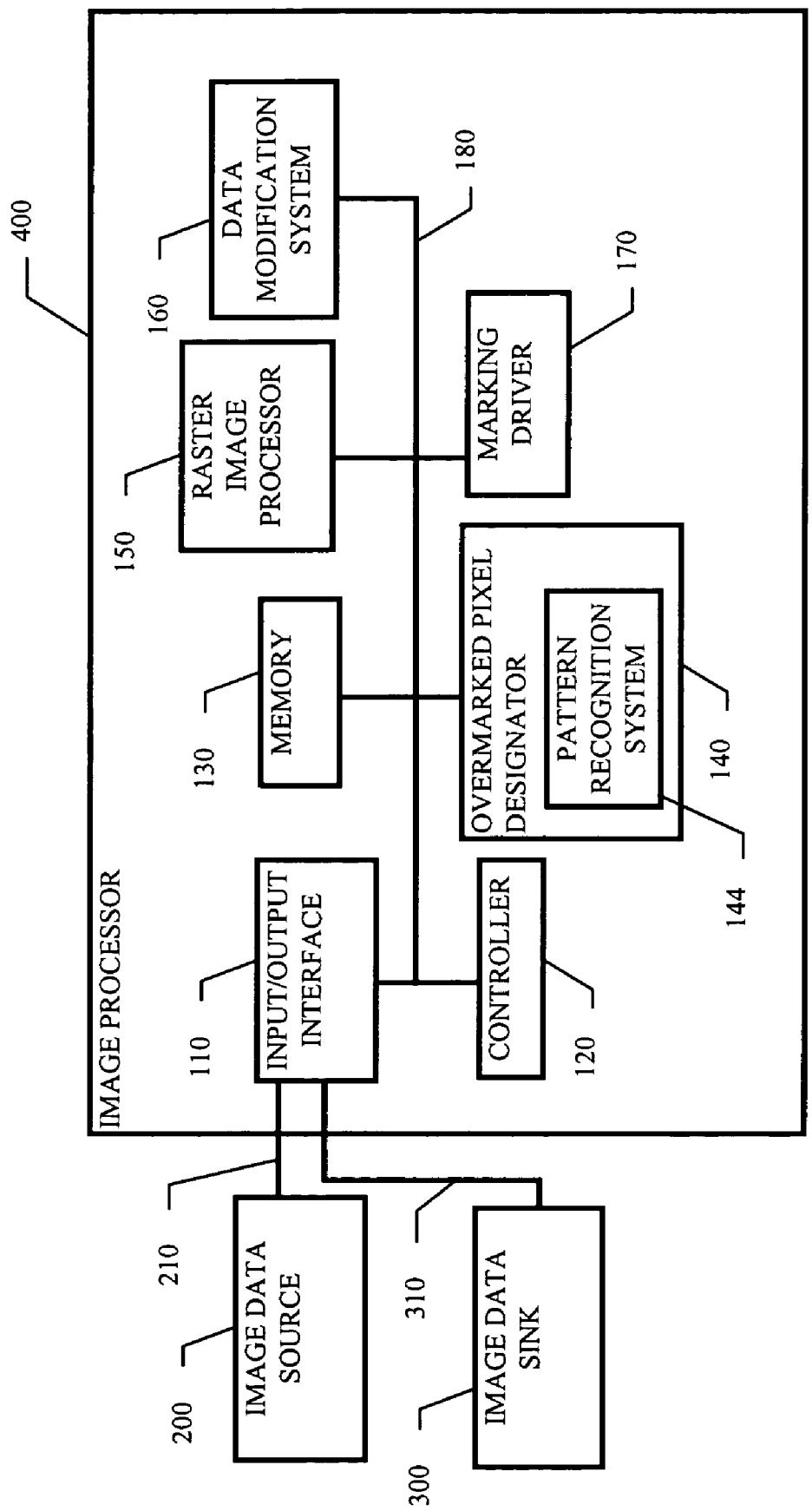
FIG. 2 is a functional block diagram of a second exemplary embodiment of an image processing system according to this invention.

FIG. 2 is a functional block diagram of a second exemplary embodiment of an image processing system according to this invention. The image processing system 400 shown in FIG. 2 is identical to the image processing system 100 shown in FIG. 1, except that the image processing system 400 of FIG. 2 has a pattern recognition system 144 instead of the tag generator 142. Therefore, explanation of elements other than the pattern recognition system 144 is omitted.

The pattern recognition system 144 is, for example, an optical pattern recognition system, such as an optical character recognition (OCR) system or the like, that analyzes input image data according to known OCR methods to determine specified patterns, such as text. The pattern recognition system 144 designates pixels that form recognized patterns as overmarked pixels. It should be appreciated that other known or later-developed text or pattern recognition systems may be used instead of OCR. Furthermore, rather than recognizing text, other patterns, such as strokes or the like, may be recognized. A stroke is a line of some thickness.

Figure 3:
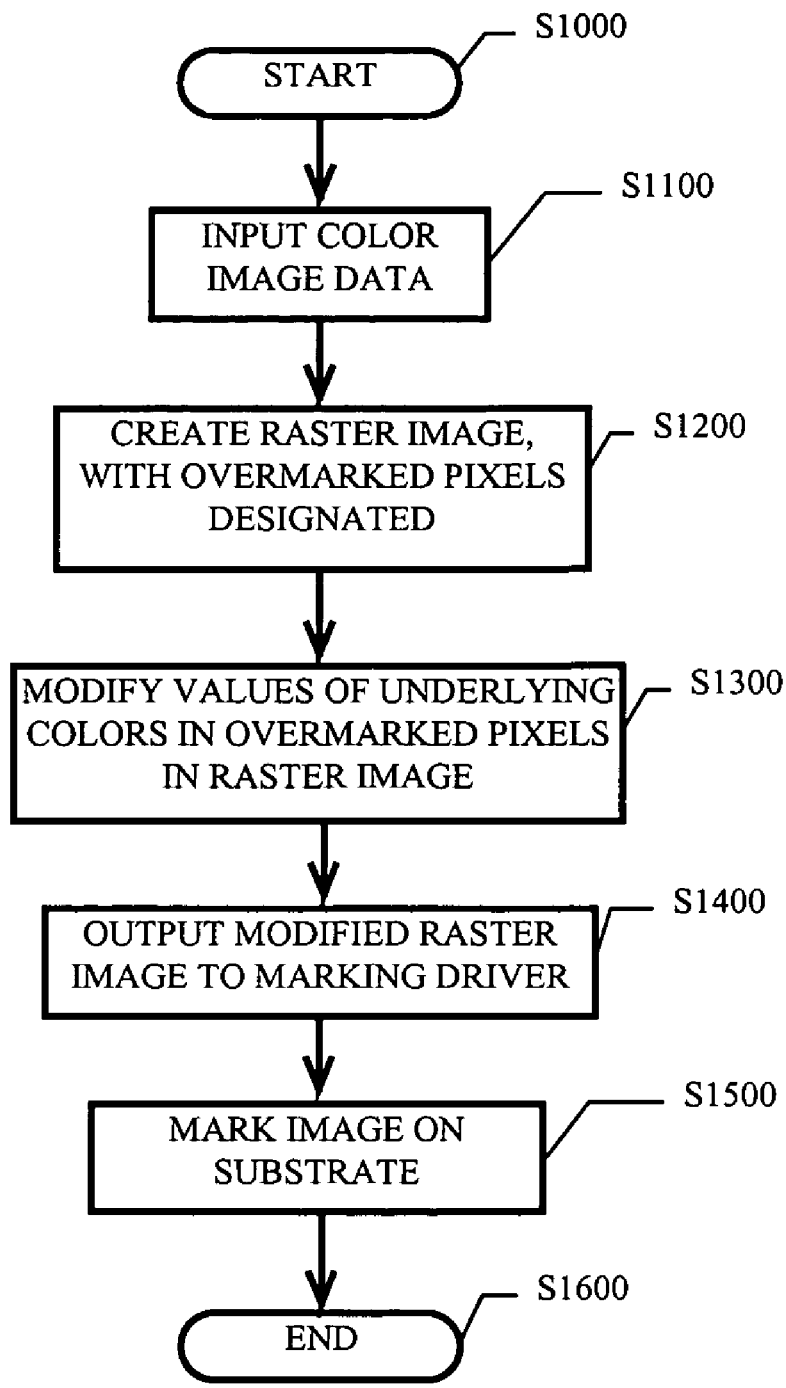
FIG. 3 is a flowchart outlining an exemplary embodiment of a method for implementing undercolor reduction according to this invention.

FIG. 3 is a flowchart outlining one exemplary embodiment of a method for implementing undercolor reduction according to this invention. Beginning in step S1000, control continues to step S1100, where color image data is input. Then, in step S1200, a raster image is created based on the color image data. Overmarked pixels are designated in the raster image. Control then continues to step S1300.

In step S1300, values of underlying colors in the overmarked pixels in the raster image are modified to create a modified raster image. Next, in step S1400, the modified raster image is output to a marking driver. Then, in step S1500, an image is marked on a substrate based on the modified raster image. Finally, in step S1600, the control procedure ends.

Figure 4:
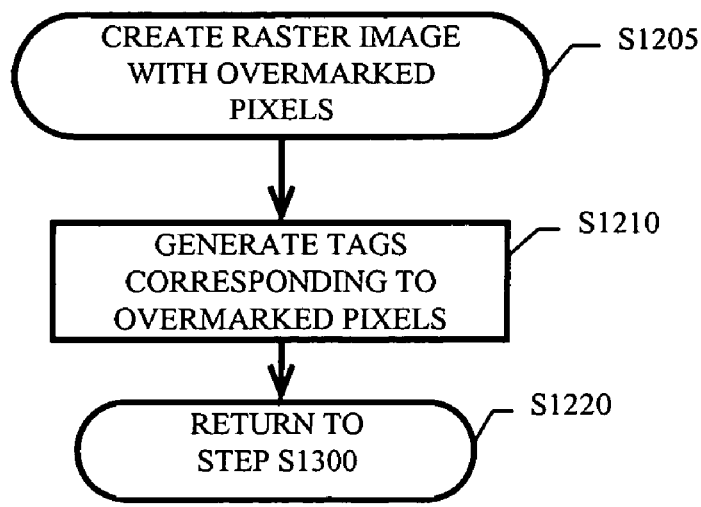
FIG. 4 is a flowchart outlining a first exemplary method for designating overmarked pixels according to this invention.

FIG. 4 is a flowchart that outlines in greater detail a first exemplary embodiment of the raster image creating step S1200 of FIG. 3. Beginning in step S1200, control continues to step S1210, where tags are generated for overmarked pixels and associated with the overmarked pixels. It should be appreciated that, rather than generating tags during the creation of the raster image, the tags may have been generated previously. The control procedure then continues to step S1220, which returns control to step S1300.

Figure 5:
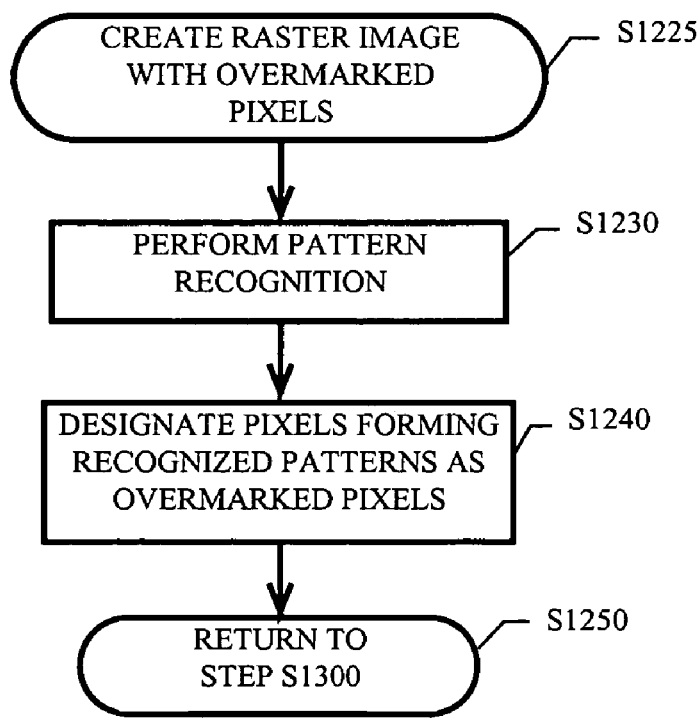
FIG. 5 is a flowchart outlining a second exemplary method for designating overmarked pixels according to this invention.

FIG. 5 is a flowchart that outlines in greater detail a second exemplary embodiment of the overmarked pixel designation step S1200 of FIG. 3. Beginning in step S1200, control continues to step S1230, where pattern recognition is performed. Then, in step S1240, pixels that form patterns that have been recognized are designated as overmarked pixels. Next, in step S1250, control is returned to step S1300.

It should be appreciated that steps S1500 and S1600 need not be performed immediately after step S1400, but may be postponed for an indefinite period of time. Furthermore, various other processing may occur between steps S1400 and S1500.

The exemplary systems shown in FIGS. 1 and 2, and the exemplary methods outlined in the flowcharts of FIGS. 3–5, are preferably implemented on a programmed general purpose computer. However, these systems and methods can also be implemented on a special purpose computer, a programmed mircroprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like, or a combination of the above. In general, any device capable of implementing a finite state machine that is in turn capable of implementing the flowcharts shown in FIGS. 3–5 can be used to implement the systems and/or methods of this invention.

While the invention has been described in conjunction with the exemplary embodiments described above, many equivalent alternatives, modifications and variations will become apparent to those skilled in the art once given this disclosure. Accordingly, the exemplary embodiments of the invention as set forth above are considered to be illustrative and not limiting. Various changes to the described embodiments may be made without departing from the spirit and scope of the invention.

For example, although black was the second, or on-top, color in the above-described embodiments, other embodiments are possible in which a color other than black is the second, or on-top, color.

What is claimed is:

1. A method of processing image data of a color image for marking, the color image containing overmarked pixels where at least one first color is to be overmarked by a second color, the method comprising:

generating information that designates the overmarked pixels;

performing raster image processing to create a raster image of the color image, the raster image processing including overmarking processing that allows both the at least one first color and the second color to be separately included in the overmarked pixels in the same raster image; and modifying image data of the overmarked pixels in the raster image to achieve undercolor reduction by reducing only a value corresponding to a reduced amount of an underlying marking material.

2. The method as set forth in claim 1, wherein modifying the image data of the overmarked pixels comprises modifying image data corresponding to the at least one first color.

3. The method as set forth in claim 1, further comprising outputting the raster image, including the modified image data, to a marking driver.

4. The method as set forth in claim 1, wherein modifying image data of the overmarked pixels comprises modifying a value of image data corresponding to the at least one first color.

5. The method as set forth in claim 4, wherein the modified value of the image data corresponding to the at least one first color results in a reduced amount of marking material corresponding to the at least one first color being applied to a marking substrate.

6. The method as set forth in claim 1, wherein generating information that designates the overmarked pixels comprises generating tags that correspond to the overmarked pixels.

7. The method as set forth in claim 6, wherein the overmarked pixels correspond to a black image and the tags indicate that the overmarked pixels are black image pixels.

8. The method as set forth in claim 6, wherein the overmarked pixels correspond to one of black text and a black stroke, and the tags indicate that the overmarked pixels are one of black text pixels and black stroke pixels.

9. The method as set forth in claim 1, wherein generating information that designates the overmarked pixels comprises performing pattern recognition that recognizes specified patterns; and designating pixels that form the recognized patterns as the overmarked pixels.

10. A system that processes image data of a color image for marking, the color image containing overmarked pixels where at least one first color is to be overmarked by a second color, the system comprising:
   an overmarked pixel designator that generates information that designates the overmarked pixels;
   a raster image processor that creates a raster image of the color image, the raster image processor provided with an overmarking function that allows both the at least one first color and the second color to be separately included in the overmarked pixels of the same raster image; and
   an image data modification unit that modifies image data of the overmarked pixels in the raster image to achieve undercolor reduction by reducing only a value corresponding to a reduced amount of an underlying marking material.

11. The system as set forth in claim 10, wherein the modified image data is image data corresponding to the at least one first color.

12. The system as set forth in claim 10, further comprising a marking driver that performs marking according to the raster image, including the modified image data.

13. The system as set forth in claim 10, wherein the image data modification unit modifies a value of image data corresponding to the at least one first color.

14. The system as set forth in claim 13, further comprising a marking driver that performs marking according to the raster image that includes the modified image data, wherein the marking driver marks a reduced amount of marking material corresponding to the at least one first color on a marking substrate based on the modified value of the image data corresponding to the at least one first color.

15. The system as set forth in claim 10, wherein the overmarked pixel designator comprises a tag generator that generates tags that correspond to the overmarked pixels.

16. The system as set forth in claim 15, wherein the overmarked pixels correspond to a black image and the tags indicate that the overmarked pixels are black image pixels.

17. The system as set forth in claim 15, wherein the overmarked pixels correspond to one of black text and a black stroke, and the tags indicate that the overmarked pixels are one of black text pixels and black stroke pixels.

18. The system as set forth in claim 10, wherein the overmarked pixel designator comprises a pattern recognition device that recognizes specified patterns and designates pixels that form the recognized patterns as the overmarked pixels.

19. A printer incorporating the system as set forth in claim 10.

20. A digital copier incorporating the system as set forth in claim 10.

21. A storage medium on which is stored a program that implements the method set forth in claim 1.

22. A method of processing image data of a color image for marking, the color image containing overmarked pixels where at least one first CMY color is to be overmarked by a black color, the method comprising:
   generating information that designates the overmarked pixels;
   performing raster image processing to create a raster image of the color image, the raster image processing including overmarking processing that allows both the at least one first CMY color and the black color to be separately included in the overmarked pixels in the same raster image; and
   modifying CMY image data of the overmarked pixels in the raster image to achieve undercolor reduction by modifying only a value corresponding to a reduced amount of an underlying CMY marking material.

* * * * *